United States Patent [19]

Kehoe et al.

[11] 4,159,536
[45] Jun. 26, 1979

[54] PORTABLE ELECTRONIC LANGUAGE TRANSLATION DEVICE

[75] Inventors: Willard E. Kehoe, 529 Venetian Ct., Bay City, Mich. 48706; R. Trezevant Wigfall, Birmingham, Mich.

[73] Assignee: Willard E. Kehoe, Bay City, Mich.

[21] Appl. No.: 785,911

[22] Filed: Apr. 8, 1977

[51] Int. Cl.² .......................................... G06F 15/38
[52] U.S. Cl. .................................................. 364/900
[58] Field of Search ... 364/200 MS File, 900 MS File

[56] References Cited
FOREIGN PATENT DOCUMENTS 1448211 9/1976 United Kingdom ...................... 364/900

Primary Examiner—Raulfe B. Zache

[57] ABSTRACT

A portable electronic language translation apparatus including a keyboard for receiving operator entered words in one language and a memory such as a programmable read only memory controlled by a microprocessor for comparing and analyzing each letter or group of letters of the keyboard entered word to determine whether the corresponding word in a second language is stored within the memory. If the corresponding word is so stored, it is displayed for viewing by the operator. The disclosed circuit permits automatic translation from one language to another without specification of the input language by the operator.

14 Claims, 4 Drawing Figures

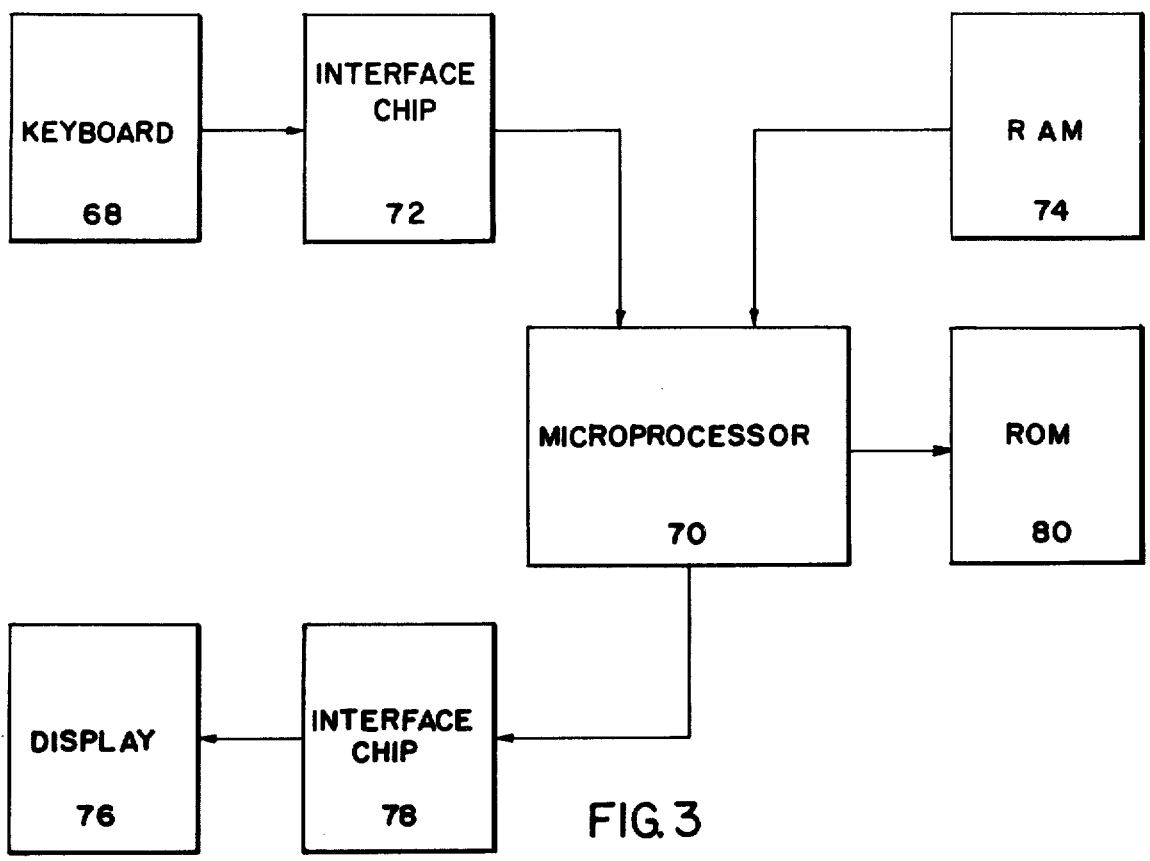
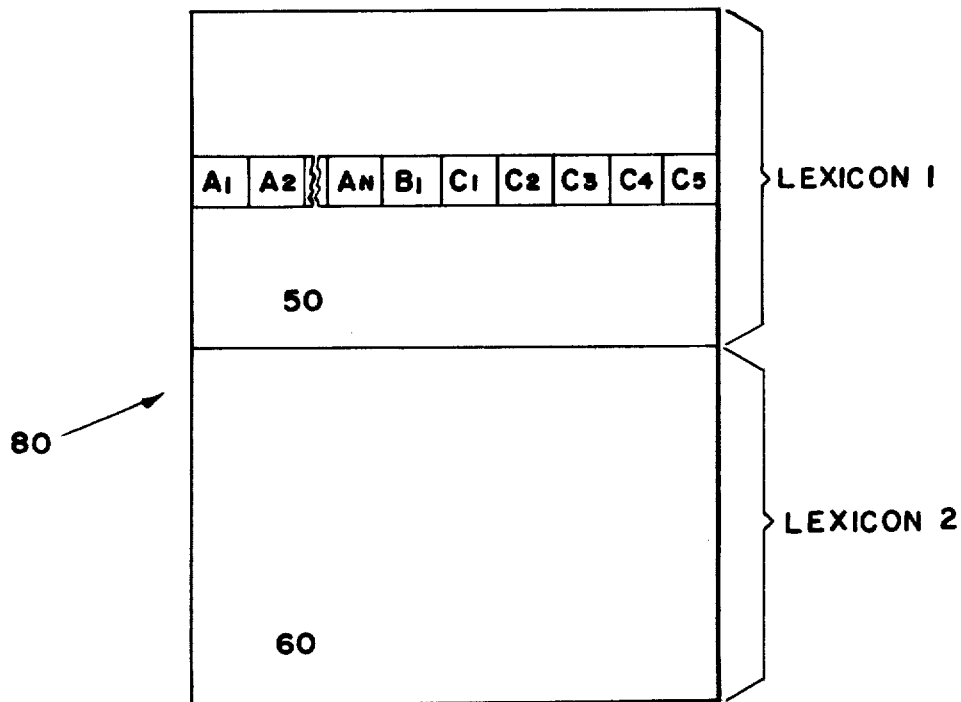

PORTABLE ELECTRONIC LANGUAGE TRANSLATION DEVICE

BACKGROUND OF THE INVENTION (1) Field of the Invention

This invention relates to the field of electronic information retrieval devices.

(2) Discussion of the Prior Art

The need for instantaneous translation between sets of intelligence symbols such as translation between two languages has long been recognized. Electronic computer controlled systems for accomplishing this objective are known but such prior art devices have failed to provide sufficient versatility and convenience. For example, U.S. Pat. No. 3,932,859 issued to Kyriakids discloses a portable electronic dictionary wherein the letters making up a word in one language are entered via a keyboard for decoding by a standard combinational logic resulting in the display of an equivalent word in another language. While the Kyriakides device is useful for the purpose disclosed, it suffers from a propensity to become confused. In particular, the Kyriakides device is designed to count the number of letters in the input and the number of times it detects each letter to define a given output. Thus, the same output could be given whether the input is "BAT" or "TAB."

Other types of systems are known as disclosed in U.S. Pat. No. 3,702,986 for language translation wherein the input language is classified and converted into a time sequence of code symbols, but again this technique requires considerable manipulation of the input signals in accordance with a predetermined program. Translation of one computer language to another type of computer language is disclosed in U.S. Pat. Nos. 3,200,379 and 3,781,814. None of these patents, however, discloses a convenient and accurate way of converting an input language into a desired output language by means of electronic circuitry which can be embodied in a portable electronic device operable without complicated controls or constraint on the type of data which can be entered into the device.

SUMMARY OF THE INVENTION

It is an object of this invention to overcome the limitations of the prior art by providing a hand-held electronic language translation apparatus which is sufficiently simple in design to be inexpensive and yet sufficiently sophisticated to provide versatile and accurate translation of a large number of words from one language to another.

In a broad sense, an object of this invention is to provide apparatus for electrically retrieving an intelligence symbol from one of a pair of sets of intelligence symbols upon the selection of an intelligence symbol from the other set in accordance with a predetermined translation between the sets. More particularly, the apparatus includes symbol storage means for permanently storing at predetermined addresses readable symbols representative of the intelligence symbols in said sets and for storing address signals in association with said readable signals in each set for identifying the address of the corresponding intelligent symbol in the other set as required by the predetermined symbol translation. Comparison means are further provided for sequentially comparing input signals representative of a selected intelligence symbol with the readable signals stored in the symbol storage means such that those address signals associated with the readable signal which corresponds to the input electrical signals may be read out for display on a symbol read out and display means.

Yet another object of this invention is to provide apparatus as indicated above including set indicating means for visually indicating the set of which each displayed intelligence symbol is a member.

Still another object of this invention is the provision of apparatus such as described above wherein the intelligence symbols are multi-letter words and wherein comparison means includes letter comparing means for comparing the first letter of the selected intelligence symbol represented by the electrical signals generated by the input means with the first letter of each intelligence symbol permanently stored in the symbol storage means; for comparing the second letter of the selected intelligence symbol with the second letter of each intelligence symbol permanently stored in the symbol storage means which was detected to have a first letter identical to the first letter of the selected intelligence symbol; and for continuing to compare corresponding letters in sequence until only one intelligence symbol stored in the symbol storage means is identified by the comparison means as having the same letters and the same sequence of letters as the selected intelligence symbol.

Yet another object of this invention is to provide apparatus as described above wherein the intelligence symbols further include word use identification and wherein the comparison means includes word use comparing means for comparing the word use identification contained within the selected intelligence symbol with the word use identification signals stored in the symbol storage means, whereby the word use identification information can be used to uniquely identify the corresponding intelligence symbol stored within the symbol storage means should more than one language word having the same letters and sequence of letters but different usage be stored in the symbol storage means.

Still another object of the invention is the provision of apparatus as described above wherein the read out display means includes a first electronic alphanumeric display means for visually displaying the selected word in one language and the word having equivalent meaning in the other language and a second electronic alphanumeric means for visually indicating the languages from which the words displayed by the first electronic display are taken, respectively.

Still another object of the invention is to provide apparatus as indicated above, wherein the input means includes a keyboard means for receiving manual input indicative of both word and word use for conversion into corresponding electrical signals and wherein the symbol read out display means includes word use indicating means for visually indicating the word use input received by the keyboard means.

Yet another object of the invention is to provide apparatus as described above, wherein the symbol storage means is a programmable read only memory (PROM), the comparison means is a micro-processor and the input means includes a random access memory (RAM) for temporarily storing electrical signals indicative of the selected intelligence symbol.

Still other and important objects of the invention will be apparent from the drawing and the description of the preferred embodiment hereinafter.

BRIEF SUMMARY OF THE DRAWING

FIG. 3 is a schematic electrical diagram of a second embodiment of an electrical circuit for practicing the subject invention; and FIG. 4 is a diagram of the read only memory of FIG. 3.

DESCRIPTION OF THE PREFERRED EMBODIMENT

Figure 1:
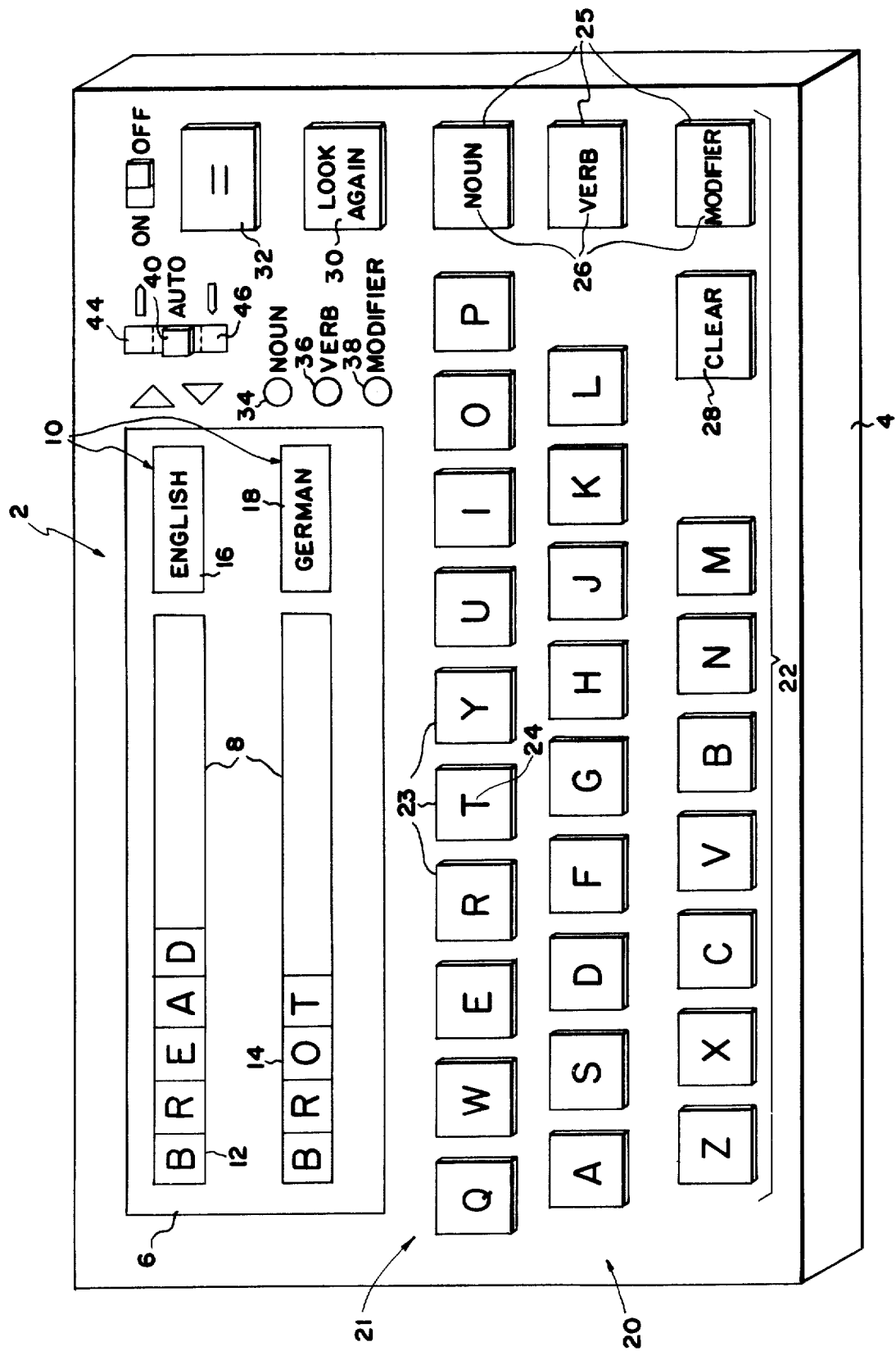
FIG. 1 is a prespective view of a portable electronic language translation device designed in accordance with the subject invention.

In FIG. 1, a portable electronic language translation device 2 is illustrated including a housing 4 on which is mounted a symbol read out and display mechanism 6. As is apparent, the symbol read out and display mechanism 6 includes a first electronic alphanumeric display screen 8 for visually displaying a selected word in one language and the word having equivalent meaning in another language. For this purpose, the first electronic alphanumeric display mechanism 8 includes a pair of alphanumeric displays 12 and 14 which could be formed of light emitting diodes (LED), or liquid crystal, or other types of electronically controlled visual displays. In addition, the symbol readout display mechanism includes a set indicating screen 10 for visually indicating the language from which the words appearing on 12 and 14 are derived, respectively. As will be explained more fully hereinbelow, other types of information may be translated by the device illustrated in FIG. 1. In fact, the disclosed device is capable of automatically displaying the result of translating an intelligence symbol selected from a first set (defined as a first collection or group of intelligence symbols) into an intelligence symbol having equivalent meaning or correspondence selected from a second set. Thus the device could be used to provide synonyms or antonyms in the same language or the device could be used to provide translation of language normally familiar only to highly trained professionals such as doctors or lawyers.

Referring again to FIG. 1, the set indicating screens 10 includes a pair of alphanumeric displays 16, 18 positioned adjacent alphanumeric displays 12, 14, respectively. As will be explained more fully hereinbelow, the display 16 will automatically indicate the language from which the word appearing in alphanumeric display 12 is derived while display 18 will visually indicate the language from which the word appearing in display 14 is derived. This arrangement provides the important advantage of permitting a word to be entered in the device and visually displayed on alphanumeric display 12 without requiring the operator to indicate from which of the two languages stored in the device he has selected the entered word. By means of the circuitry to be described hereinafter, the translation of the input word into the second language is automatically visuallly displayed on display 14 combined with a visual indication on displays 16 and 18 of the languages or sets of which the words or intelligence symbols are a part. Alternatively, the same display can be used for both input and output, such as in a calculator. In yet another variation, one or more of the displays can be replaced with an audio-read-out.

Also mounted on the housing 4 is an input mechanism 20 for generating electrical signals indicative of the selected word or intelligence symbol. The input mechanism includes a keyboard input mechanism 22 for receiving manual input indicative of both word and word use for conversion into corresponding electrical signals. As illustrated in FIG. 1, the keyboard input mechanism includes a keyboard 21 having a plurality of manually actuated, letter entering keys 23 bearing alphabet indicia 24 corresponding to the letter being entered by the key. The keyboard 21 also includes a plurality of keys 25 bearing word use indicia 26 such as "noun," "verb" and "modifier." The keyboard 21 also includes special function keys such as a clear key 28 for removing inadvertent input information on display 12 and for removing information from all of the displays 12, 14, 16 and 18 whenever the user of the apparatus no longer wishes to have translation information displayed.

In some instances, it is possible that a word in one language has more than one equivalent word meaning in a second language. The keyboard 21 includes a key 30, bearing the indicia "look again," which upon actuation will recall additional translations which may be stored in a memory 54 to be described more particularly hereinafter. The keyboard input mechanism 22 includes a key 32 actuated by the user following entry of the letters of the word which he desires to have translated. The key 32, which closes a normally open switch 32a bears an equal sign indicia "=" to indicate that this is the key which is to be pushed in order to retrieve an equivalent word from a second language when a word from a first language has been inserted via letter entering keys 23. A plurality of indicator lights 34, 36 and 38 bearing indicia "noun," "verb," and "modifier," are provided and automatically illuminate upon depression of corresponding word use indicator keys 26 in order to visually indicate to the user the corresponding word use of the word which has been inserted into the device for translation. Alternatively the device can be designed to automatically indicate the word use via lights 34, 36 or 38, thereby to insure that the translation retrieved from storage is in fact the correct translation desired by the user.

The keyboard input mechanism includes a switch 40 which is operable to restrict translation to a single direction such as permitting only translation of English words into German, or, the translation of German words into English, dependent upon whether the switch element 40 is moved in one direction to a position illustrated in chain lines at 44 or an opposite position, illustrated in chain lines at 46. So long as the switch 40 remains in the center position as illustrated, the device will automatically search both the English and German stored signals (as will immediately become apparent) to find an equivalent word to thereby permit not only display of the translation on displays 12 and 14 but also the respective languages from which the words are derived on displays 16 and 18, respectively.

Figure 2:
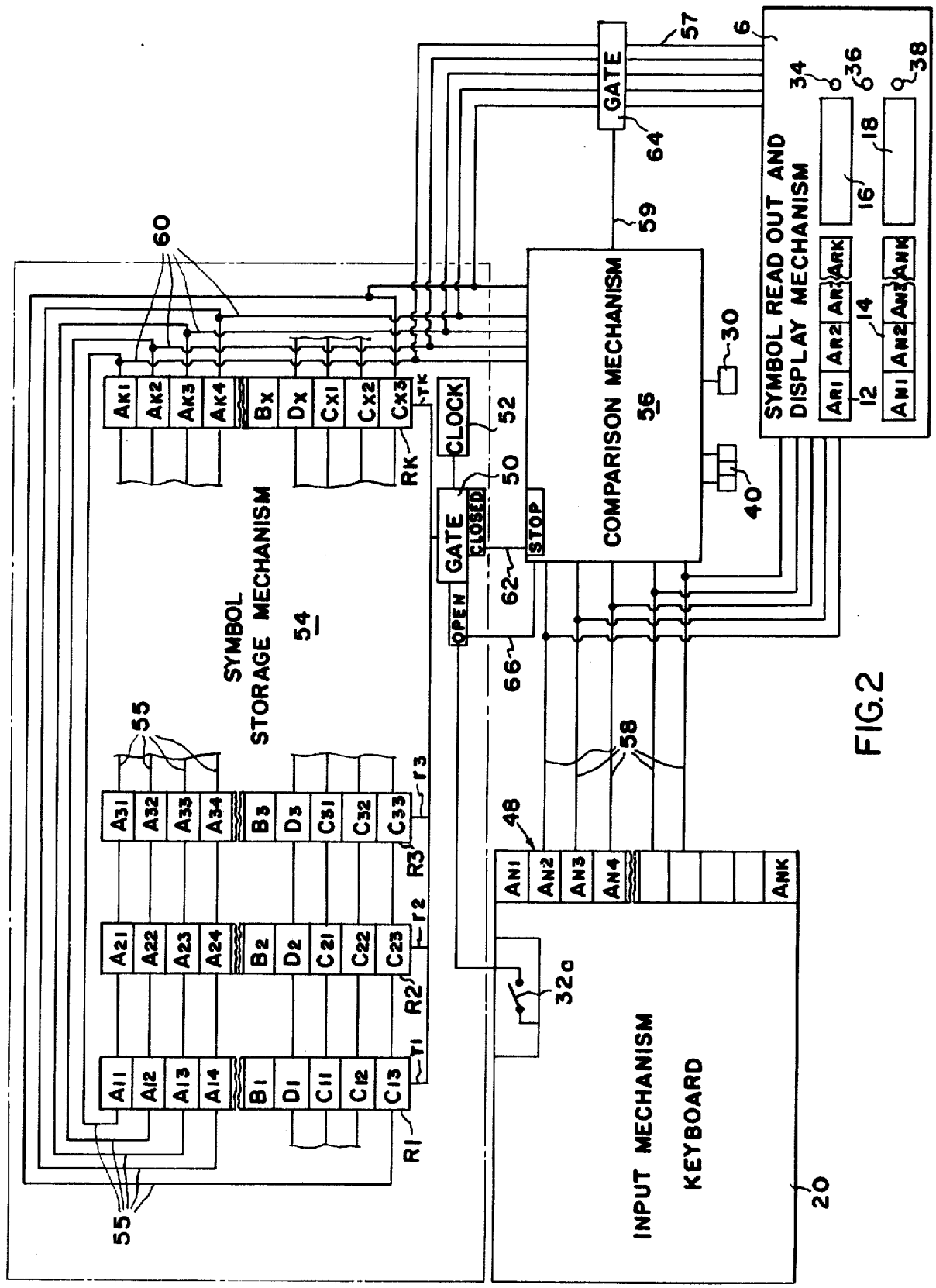
FIG. 2 is a schematic diagram of one embodiment of an electrical circuit for practicing the subject invention.

Turning now to FIG. 2, one specific embodiment of the circuitry of this invention is disclosed wherein the input mechanism 20 is illustrated in the form of a block having a temporary storage mechanism 48 designed to receive and temporarily store electrical signals indicative of a selected word by sequential actuation of the letter keys 23 (FIG. 1) of the keyboard mechanism 22. The temporary storage mechanism 48 includes individual registers $A_{n1}$, $A_{n2}$ ... for storing code signals indicative of the actuation of selected letter keys 23. The temporary storage mechanism 48 may also include individual registers for storing coded signals indicative of the word use identification as indicated by manual actuation of word use keys 26.

The translation key 32 is coupled to an electrical gate 50 which is connected to a clock 52 and to a symbol storage device 54, including K registers R1, R2, . . . RK wherein K is equal to the total number of words stored in the symbol storage mechanism 54. Upon completion of the input of a word translation of which is desired, the translation key 32 is depressed to open the gate 50 thereby allowing clock pulses from the clock 52 to pass to each of K registers R1, R2, . . . RK. The Registers R1, . . . $R_k$ are characterized by the ability to automatically transmit the signals stored therein to the next succeeding register while receiving the signals stored in the next preceding register upon receipt of a clock pulse at $r_1, r_2 \ldots r_k$, respectively. Successive clock pulses cause the signals in registers R1, . . . $R_k$ to advance step by step in a recirculating pattern via conductors 55 which form a serial loop including the registers.

Each of the storage registers R1 . . . RK further includes storage cells $A_{xy}$ for storing individual letters forming words in one of a pair of sets of words wherein each set constitutes a language. Also stored in one of the storage cells $B_x$ in each register is a signal indicative of the language from which the word is derived. Each of the storage registers $R_1$ . . . RK includes a storage cell $D_x$ storing a signal indicative of the word usage. Each of the storage registers R1 . . . RK also includes storage cells $C_{x1}$ through $C_{xz}$ storing signals indicative of the address of the register containing the equivalent word in a second set (language) of intelligence symbols.

Once the word desired to be translated has been entered via the keyboard into temporary storage mechanism 48, the key 32 may be actuated to close switch 32a and cause the clock 52 to serially advance the signal stored in registers R1 through $R_k$ such that the signals stored in $R_k$ may be compared with the signal stored in temporary storage mechanism 48. A comparison mechanism, generally designated 56, is interconnected with the respective storage devices 48 and 54 via ganged conductors 58 and 60, respectively. Upon detection of equality between the signal stored in temporary storage mechanism 48 and register $R_k$, comparison means 56 causes a stop signal to be transmitted via line 62 in order to halt transmission of pulses from the clock 52 to registers $R_1$ through $R_k$. The comparison mechanism 56 operates via gate 64 to transmit the language indication symbol $B_k$ to display 16 in order to automatically indicate the language from which the initial input word is derived. The comparison mechanism then reads the address residing in elements $C_{x1}, C_{x2}, C_{x3}$ to cause gate 50 to be opened via a signal transmitted over conductor 66 to thereby advance the word which represents the desired translation of the word found to be identical to the word in temporary storage means 48, a requisite number of steps such that the proper corresponding word is advanced to register $R_k$. When the requisite number of advancement steps have been accomplished, a stop signal is transmitted to gate 50 via conductor 62 and the word now residing within register $R_k$ is read out by comparison mechanism 56 via gate 64 into display 14 along with the appropriate language indication information stored in element $B_k$ of register $R_k$ for display by visual display 18.

As illustrated in FIG. 2, the "look again" key 30 may be electrically connected to comparison mechanism 56 for the purpose of causing the comparison mechanism 56 to advance to alternative word definitions which may be stored in symbol storage means 54 and the translation restriction switch 40 may also be electrically connected with the comparison mechanism 56 so as to limit the comparison steps to intelligence symbols stored in respective registers wherein the symbol includes a language indicator $B_k$ indicative to only one language.

The symbol storage mechanism 54, including registers $R_1, \ldots R_k$ constitutes, a recirculating memory. Alternatively, the symbol storage mechanism 54 may include an addressable memory for storing the code signals indicative of letters forming individual words and the associated signals indicative of the address in the addressable memory at which an equivalent word is stored. When an addressable memory is used, the circuit would also include an addressing device and a logic device to access each stored location for comparison by comparison mechanism 56 with the signals in input register 48.

By way of contrast with the embodiment of FIG. 2, a schematic diagram of another embodiment of the invention is disclosed in FIG. 3 wherein a microprocessor is employed to carry out the subject invention is a manner identical to the circuit of FIG. 2, modified to include an addressable memory as described above. Referring more particularly to FIG. 3, the keyboard 68 generates electrical signals which are decoded and transmitted to a microprocessor 70 (MOS Technology MCS 6502 or equivalent) via an interface chip 72 (MOS Technology MCS 6520 or a Motorola MC 68–20). The electrical signals generated by the keyboard 68 are stored in a temporary storage mechanism 74 which constitutes a random access memory (RAM—Motorola MCM 6810). A display 76, interconnected with the microprocessor 70 by means of an interface chip 78, provides a visual display of the input word represented by signals generated by keyboard 68. Depression of the translation key 32 (illustrated in FIG. 1) causes the microprocessor 70 to begin a search and compare through the words stored in a read only memory (ROM) 80 (Motorola MCM 6830) which will be described in greater detail with reference to FIG. 4.

Basically, FIG. 4 discloses that the ROM 80 is divided into two separate lexicons, 1 and 2. Memory spaces are allocated for the characters of the stored word $A_1$ to $A_n$. One or more memory locations may be used for word use identification terms $B_1$. The address of the associated word in the second language is stored in memory locations $C_1$ to $C_5$. The word entered via the keyboard 68 is stored in RAM 74 in a similar format except that no address is stored since that is the function performed during translation. In performing the search and compare sequence, the microprocessor takes the first character in the entry word and compares it to the first character in the first word in lexicon one. If the characters are the same, the microprocessor takes the second character of the entry working, compares it to the second character of the first word in lexicon 1. If the characters match, similar comparisons are made with the third and subsequent characters.

Should any character in the input word fail to match the corresponding character in the first word of lexicon one, the microprocessor 70 begins a comparison routine beginning with the first character of the input word and the first character of the second word in lexicon one. The comparison process continues as described above. Each word in the lexicon is used as a base comparison unto all respective characters in the input word and at least one lexicon entry are found to match. When such a match is found, the location of the matching entry and the address of the corresponding word in the opposite lexicon are stored in RAM 74. The corresponding word in the opposite lexicon is then shown on the display 76. Should the entire lexicon be exhausted without finding a match, a message from ROM 80 is shown on the display 76 indicating the word was not found.

As described above, the microprocessor may be operated to compare the entered word to the lexicon entries one character at a time. However, the comparison can occur two or more characters at a time. When the comparison is thus carried out, the entire word is still analyzed with each character taken in order.

Words of a given character sequence, i.e., identically spelled, can be translated frequently in several ways. If such words are stored as entires in the lexicon, the normal operation of the translator will cause the first entry to be used in the translation process. Since the location of that entry is stored during the translation routine, the translator can be commanded to search the rest of the lexicon if the user so desires. Such a command is initiated by depressing one of the operator keys.

Words of a given character sequence occasionally take disparate meanings based on their use. The American word "train" has radically different meanings in its noun and verb forms. The device thus makes use of the translation keys 26 to cause a corresponding descriptor code ("noun," "verb," "modifier") to be stored with the input word. Thus, as in the case of the circuit illustrated in FIG. 3, the microprocessor executes the compare routine described previously using not only the respective characters of the input word in lexicon entry but also the word use indicator in a similar fashion. Accordingly, the device is able to analyze not only spelling but also usage, thereby greatly reducing the occurence of translation error. If the user does not specify word use description, the corresponding code is not used in the translation process. The translated word can display word use status even though no word use description is used on the input word. Display of this information can also help to reduce misunderstandings.

The organization of the lexicons illustrated in FIG. 4 demonstrate that the location of any entry specifies which of the two languages it is a part and by obvious implication, the direction of the translation. This direction of the translation is part of the information which may be shown on the display illustrated in FIG. 1. The availability to scan both lexicons and display the direction of translation enables the invention to not only translate in either direction but also to do so automatically.

The operation of the system is unaffected by the languages used in lexicons by changing the electronic components which constitute the ROM 80, the languages being translated may be changed. Thus, one device would easily provide a multilingual capability by merely changing components. Moreover, the use of specialized lexicons can provide translation of scientific or medical terms.

The following is a microprocessor program (hexidecimal language) with which the basic translation functions described above could be performed under the control of a microprocessor as interconnected with the input/output elements and storage elements, all as illustrated in FIG. 3:

KEHOE MAINLINE LIST

```
KIM
F072  A0   17F7
17F7  BE   87.
17F8  F0
17F9  11   F000
F000  A2   Q
;18F000A2FF9A18D8A9018D0520A9008D0420A9058D0520A9288D0709AE
;18F01820A9FF8D0620A9208D0720A9008500AAA9F28501A9208D060A6D
;18F03020EAEAEAEAC93DD0F82046F02072F0EAEAEAEA4C23F0A0FF114C
;18F048C8B100D90200D00FC93DD0F4C8B1008512C8B100851360A50C73
;18F06000E600EAEAC98030DDA9808512A9F2851360A0FFC8B1128D0E82
;18F0780620C93DD0F660AD04209502E85840A2FFE88A48205A1EEA0C97
;0000060006
17F7
17F7  87   90.
17F8  F0   F2.
17F9  11   F200
F200  44   Q
;18F200444F473D40F276457265F664548DD2484341543D50F23D840B52
;18F218FA017A69B1A94099504F5441544F3D60F208B3C08AFE62190C17
;18F230494E56454E543D70F2893B41C0F7128A48554E443D00F2EB0B4E
;18F248FB6BB30910CD82A94B41545A453D10F2F6893650B26A70DF0CAA
;18F2604B4152544F46464654C3D20F23883BF05455246494E4445E0921
;18F2783D30F2009DD50C832E2E2E2E3D407D04FD4BFF83BD42FD0B8C
;0000060006
```

Numerous advantages and desirable features unknown heretofore in the art of portable electronic translation devices have been disclosed. For example, the subject invention employs a keyboard for entering not only whole words, but also word use indicators and translation commands, thereby enabling the device to perform highly useful functions such as selective automatic translation from one language to another or single one-way translation from a first language to a second language. The device further provides a display means capable of showing the input word, the word use indicators, the translated word and the direction in which the translations have been performed. The device accomplishes the retrieval of translation information via a character-by-character sequential comparison without the need for abstraction and mathematical manipulation of the input signals. The device also provides for a "look again" capability which allows the lexicon to be searched for multiple meanings for a single input word.

We claim:

1. Apparatus for electrically retrieving any selected one of a plurality of intelligence symbols from one of a pair of sets of intelligence symbols in accordance with a predetermined translation between the sets, comprising
    (a) input means for generating an electrical signal indicative of the selected intelligence symbol;
    (b) symbol storage means for storing a readable signal representative of each intelligence symbol in each said set at a separate address unique to each said intelligence symbol in each said set and for storing an address signal in association with each said readable signal in at least one said set for identifying the address of the corresponding intelligence symbol in the other set as required by the predetermined symbol translation;
    (c) comparison means connected with said input means and said symbol storage means for sequentially comparing said electrical signal generated by said input means with said readable signals with which address signals are associated and for reading out the address signal associated with the readable signal which corresponds to said electrical signal generated by said input means; and
    (d) symbol read out and display means connected with said symbol storage means and said comparison means for visually displaying the selected intelligence symbol and for reading out and displaying the intelligence symbol represented by the readable signal stored at the address read out by said comparison means.

2. Apparatus as defined in claim 1, wherein said symbol storage means is a programmable read only memory and said comparison means is a microprocessor.

3. Apparatus as defined in claim 2, wherein said input means includes a random access memory for temporarily storing electrical signals indicative of the selected intelligence symbol.

4. Apparatus as defined in claim 3, further including a portable housing; wherein said input means is a keyboard mounted on said portable housing; said symbol storage means and said comparison means are mounted within said portable housing; and said symbol read out and display means includes an electronic alphanumeric display mounted on the exterior of said portable housing.

5. Apparatus as defined in claim 4, wherein said programmable read only memory is a replaceable plug-in unit, whereby the permanently stored addressable signals may be changed selectively by replacing the plug-in unit with another plug-in unit having a different pair of sets of intelligence symbols.

6. Apparatus as defined in claim 1, wherein said comparison means includes set limiting means for limiting the sequential comparison to only addressable signals representative of intelligence symbols contained within a single set.

7. Apparatus as defined in claim 1, wherein said symbol storage means stores an address signal in association with each said readable signal in both sets for identifying the address of the corresponding intelligence symbol in the other set as required by the predetermined symbol translation.

8. Apparatus for electrically retrieving an intelligence symbol from one of a pair of sets of intelligence symbols in accordance with a predetermined translation between the sets, comprising:
    (a) input means for generating electrical signals indicative of the selected integlligence symbol;
    (b) symbol storage means for permanently storing at predetermined addresses readable signals representative of the intelligence symbols in said sets and for storing address signals in association with said readable signals in each set for identifying the address of the corresponding intelligence symbol in the other set as required by the predetermined symbol translation;
    (c) comparison means connected with said input means and said symbol storage means for sequentially comparing said electrical signals generated by said input means with said readable signals and for reading out said address signals associated with the readable signal which corresponds to said electrical signals generated by said input means; and
    (d) symbol read out and display means connected with said symbol storage means and said comparison means for visually displaying the selected intelligence symbol and for reading out and displaying the intelligence symbol represented by the readable signals stored at the address read out by said comparison means, said symbol read out and display means includes set indicating means for visually indicating the set of which each displayed intelligence symbol is a member.

9. Apparatus as defined in claim 8, wherein each set is a language and each intelligence symbol is a word and wherein the predetermined symbol translation constitutes a translation of meaning from one language to the other and further wherein said symbol read out and display means includes a first electronic alphanumeric display means for visually displaying the selected word in one language and the word having equivalent meaning in the other language.

10. Apparatus as defined in claim 9, wherein said set indicating means includes a second electronic alphanumeric display means for visually displaying the language of which the respective words displayed by said first electronic alphanumeric display means are a part.

11. Apparatus as defined in claim 10, wherein each said intelligence symbol includes a word and a word use identification and wherein said input means includes a keyboard input means for receiving manual input indicative of both word and word use for conversion into corresponding electrical signals and further, wherein said symbol read out and display means includes word use indicating means for visually indicating the word use input received by said keyboard means.

12. Apparatus for electrically translating a multi-letter word selected from one language into a corresponding word in another language, comprising:
    (a) input means for generating electrical signals indicative of the letters in the selected word;
    (b) symbol storage means for permanently storing at predetermined addresses readable signals representative of corresponding words in both languages, said readable signals including letter signals representative of each letter in each word and for storing address signals in association with said readable signals representative of words in one language for identifying the address of the corresponding word in the other language;
    (c) comparison means connected with said input means and said symbol storage means for comparing said electrical signals generated by said input means with said readable signals and for reading out said address signals associated with the readable signals which correspond to said electrical signals generated by said input means;

(d) symbol read out and display means connected with said symbol storage means and said comparison means for visually displaying the selected word and for reading out and displaying the word represented by the readable signals stored at the address read out by said comparison means.

13. Apparatus as defined in claim 12, wherein said comparison means includes letter comparing means for:
   (a) comparing the electrical signals generated by said input means representative of the first letter of the selected word with the letter signals representative of the first letter of each word stored in said symbol storage means,
   (b) comparing the electrical signals representative of the second letter of said selected word with the letter signals representative of the second letter of each word stored in said symbol storage means which was detected to have a first letter identical to the first letter of said selected word, and
   (c) continuing to compare the electrical signals representative of the successive letters in the selected word with the letter signals representative of the corresponding letters in each word stored in said symbol storage means until only one word stored in said symbol storage means is identified by said comparison means as having the same letters and the same sequence of letters as said selected word.

14. Apparatus as defined in claim 1, wherein the intelligence symbols further include word use identification and wherein said symbol storage means further stores use signals indicative of word use in association with each readable signal indicative of the corresponding word and wherein said comparison means include word use comparing means for comparing the word use identification associated with said selected intelligence symbol with the word use signals stored in said symbol storage means, whereby the word use identification information can be used to uniquely identify the corresponding intelligence symbol stored within said symbol storage means should more than one language word having the same letters and sequence of letters be stored in said symbol storage means.

* * * * *